Aug. 11, 1964     K. LANGLITZ     3,144,496

CONVERTER SUPPORT

Filed Feb. 20, 1961

INVENTOR

Karlheinz Langlitz

By

Michael S. Striker

Attorney

United States Patent Office 3,144,496
Patented Aug. 11, 1964

3,144,496
CONVERTER SUPPORT
Karlheinz Langlitz, Mulheim (Ruhr), Germany, assignor to Demag Aktiengesellschaft, Duisburg, Germany
Filed Feb. 20, 1961, Ser. No. 90,496
Claims priority, application Germany Feb. 20, 1960
8 Claims. (Cl. 266—36)

The present invention relates to a converter support, and more particularly to a converter support permitting removal of the converter from a supporting cage without lifting the converter.

The present invention relates to converters where the reactions for converting iron into steel take place by introducing oxygen. To obtain speedy and uniform reactions, the converter is arranged to be rotatable about the main axis, and carried in a tiltable cage.

Converter supports are known in which the cage includes circular supporting surfaces in rolling engagement with supporting rollers and permitting the tilting of the converter. However, the constructions of the prior art do not permit a horizontal removal of the converter from the cage, but require very heavy and powerful overhead cranes for lifting the converters when the same have to be exchanged.

Other known converter supports provide cage members which include pivoted segment portions which, together with the main part of the cage members, form circular supporting surfaces. Blocking means for holding the converter in the normal operating position are secured to the pivot segment portions of the cage members so that the converter is confined by the cage members and blocking means in its normal operative position, but can be removed when the pivoted segments of the cage members are retracted.

This construction has the disadvantage that the circular surfaces of the cage members are not continuous and integral, but necessarily have gaps between the segment portions and the main portions along the circular supporting surfaces, so that a smooth turning or tilting of the conveyor support is not possible due to the engagement of the gaps with the supporting rollers on which the circular supporting surfaces of the cage members run.

It is one object of the present invention to overcome the disadvantages of the known constructions for tiltably supporting converters, and to provide a converter support which can be smoothly tilted with the converter, while permitting removal of the converter in horizontal direction from the cage in which the converter is supported for turning movement.

Another object of the present invention is to provide a cage for a turnable converter constructed in such a manner as to have continuous integral annular support faces on which the cage, and thereby the converter, can be supported for tilting movement.

Another object of the present invention is to provide a converter cage including confining means movable between a confining position retaining the converter in operative position, and a releasing position permitting removal of the converter from the cage in a direction transverse to the converter main axis.

With these objects in view, the present invention relates to a converter support arrangement permitting turning, tilting, and removal of the converter. One embodiment of the present invention comprises cage means including two cage members located on opposite sides of the converter spaced from the same and having continuous integral annular peripheral surfaces, first confining means located in the rear of the converter between the cage members, second confining means located in front of the converter and being mounted on the cage members for movement between a confining position located between the cage members and a releasing position retracted from the front of the converter, and means for securing the second confining means in said confining position to the cage members. The first and second confining means include means for example rollers, for guiding the converter during turning movement in the cage means about its main axis. However, the second confining means must be in the confining position in which the front of the converter is closed so that the converter is confined and guided for turning movement about its main axis. When the second confining means are moved to the releasing position, the front of the cage is open, and the converter can be removed through the open front of the cage, preferably by means of a carriage supporting the converter in upright position and being movable in horizontal direction. Supporting means, such as rollers, are in contact with the annular, and preferably circular surfaces of the cage members and support the cage means and thereby the converter for turning and tilting movement.

In the preferred embodiment of the invention, the second confining means include a pair of levers pivotally mounted on the cage members and beams extending between the levers. The levers can be raised to a higher position located above the top of the converter when the same is in a vertical position, permitting the removal of the converter through the open front of the cage means.

The converter has circular supporting surfaces located in planes perpendicular to the main axis of the converter, and such circular supporting surfaces are engaged by supports, preferably including rollers, which are mounted on the cage members. These supports take up the weight of the converter when the same is in upright position, and also take up the axial component of the weight when the converter is tilted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
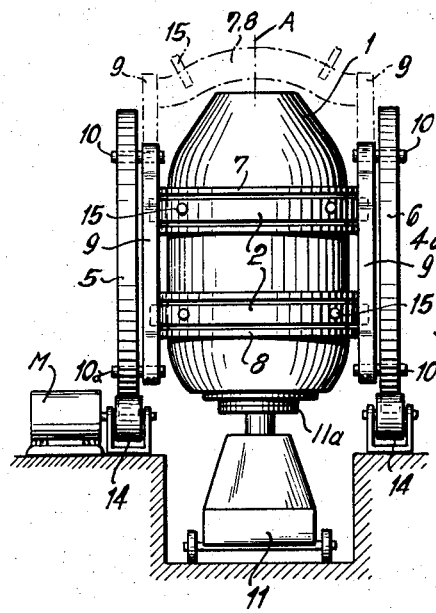
FIG. 1 is a front view of a converter support arrangement according to one embodiment of the invention.

Referring now to the drawings, an elongated converter 1 having a main axis A is surrounded by two fixed circular rings 2 concentric with the main axis A. Rings 2 have circular surface portions located in planes perpendicular to the main axis A, and other circular surface portions parallel to the main axis A.

The converter 1 is located in a cage which includes a pair of lateral annular cage members 5 and 6, each of which has a circular integral continuous surface with a common axis extending perpendicular to the main axis A and intersecting the same. The circular surfaces of cage members 5 and 6 roll on two pairs of supporting rollers 14. One roller of each pair is driven by a motor M so that the cage members are rotated when the respective rollers 14 are driven.

First confining means 4 connect the cage members 5 and 6 in the rear of the converter 2 and include a plurality of arcuate beams following the contour of the converter, and supporting rollers 3 which are in rolling engagement with the peripheral circular surface portions of the rings 2 on the converter. A motor 4a drives rollers 3.

Second confining means are provided in front of the converter, and include a pair of levers 9 mounted inwardly of cage members 5 and 6, respectively, on pivot pins 10 which are located in the upper part of the cage members 5 and 6 when the converter 1 is in the illustrated upright position. Beam means 7 and 8 extend between the levers 9, each beam means including two spaced U-sections which are spaced along levers 9 a distance corresponding to the distance between the rings 2. The confining means 7, 8, 9 are normally in a confining position in which pins 10a project into corresponding openings of cage members 5, 6 and levers 9 so that the levers are rigidly connected to the cage members. In this position of the levers 9 and beams 7 and 8, pins 15 engage the circular surface portions of rings 2, and confine the converter. It is evident that in the inverted position of the cage members 5 and 6, the pins 10a can be used as pivot pins, and the pins 10 can be used as holding pins for holding the levers 9 in the confining position.

Figure 3:
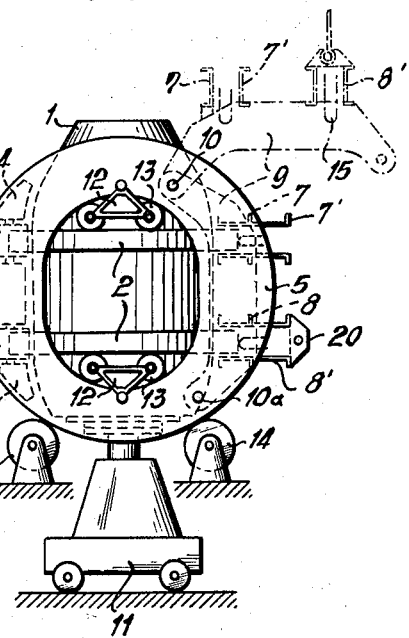
FIG. 3 is a side view of the embodiment shown in FIG. 1.
Figure 2:
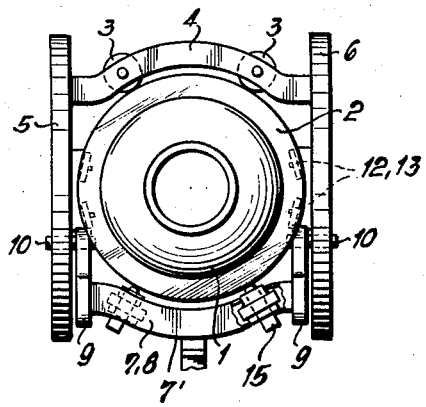
FIG. 2 is a plan view of the embodiment shown in FIG. 1.

Upon release pivot pins 10a in the position shown in the drawing, the levers 9 can be raised to the upper releasing position shown in chain lines in FIG. 3, which may be accomplished by a crane member 20 shown to engage the projecting portion 8' of the arcuate beam means 8. The corresponding projecting portions 7' of the arcuate beam means 7 may be engaged by a corresponding crane part when the cage is inverted and the levers 9 are pivoted about pins 10a.

Each of the cage members 5 and 6 supports a pair of pivotally mounted trolleys 12 with a pair of rollers 13 which engage the axial circular surface portions of rings 2 to support the converter 1 in axial direction.

The converter support is arranged above a pit in which a carriage 11 is located. Carriage 11 has a hydraulic jack part 11a which can be moved between an inoperative lower position and an operative position engaging the bottom of converter 1, as illustrated.

During normal operations of the converter, the jack member 11a is lowered, and the carriage 11 may be rolled away from the converter. The converter is rotated about its main axis A by rollers 3 driven by motor 4a, and when tilting of the converter is desired, motor M turns rollers 14 so that the cage members 5 and 6 roll or rollers 14 and turn the converter about the axis of the circular peripheral surfaces of the cage members 5 and 6. Since the circular peripheral surfaces of cage members 5 and 6 are integral and continuous, such tilting will take place in a very smooth movement. During these operations, the confining means 9, 7, 8 are fixedly connected to the cage members by pins 10 and the 10a so that the pins 15 abut the circular surface portions of rings 2, and confine the converter. The radial pins 15 can be advanced and retracted by hydraulic means, electromagnetic means, or by threaded spindles, not shown, or they may be spring loaded. If it is desired to rotate the converter about its means axis, the cage is tilted to a position in which the weight of the converter rests on rollers 3 and rollers 13, and the pins 15 are retracted. If it is desired to rotate the converter in all positions of the cage, rollers corresponding to rollers 3 are substituted for pins 15 on the beams 7 and 8.

When it is desired to remove the converter 2 for inspection or repair, the carriage 11 is placed below the converter, and the jack 11a is raised until it supports the converter. The crane member 20 is attached to the beam 8, pin 10a is removed, and the levers 9 are pivoted to the retracted position shown in the upper part of FIG. 3 in chain lines. Thereupon, the carriage is moved to the right as viewed in FIG. 3 while converter 1 moves through the open front of the cage between the cage members 5 and 6 until it is located outside of the cage members. Another converter may be rolled into the cage by another carriage 11, whereupon the second confining means 7, 8, 9 are lowered, and locked in position by pins 10a.

From the above description of the preferred embodiment of the invention it will become apparent that the converter support of the present invention permits a removal of the converter in horizontal direction, providing smooth and continuous uninterrupted annular supporting surfaces on the cage members which permit tilting of the converter without any jolts or jerks.

It will be understood that each of the elements described above, or two or more together, may also find a useful application in other types of converter supports differing from the types described above.

While the invention has been illustrated and described as embodied in a converter support including circular cage members having integral continuous uninterrupted supporting surfaces, and confining means permitting removal of the converter in horizontal direction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A converter support arrangement, comprising, in combination, a converter having a main axis; cage means including two rigid and integral cage members located on opposite sides of said converter spaced from the same and having continuous integral annular peripheral surfaces, first confining means located in the rear of said converter between said cage members and closing said cage means in the rear of said converter, second confining means located in front of said converter and including a pair of levers pivotally mounted on said cage members, respectively, in the space between the latter and said converter and beam means extending between said levers, said second confining means being turnable about an axis substantially normal to said main axis of said converter between a confining position located between said cage members so that said cage means is closed in front of said converter and a releasing position retracted from the front of said converter so that said cage means is open in front of said converter, and means for securing said second confining means in said confining position to said cage members, said first and second confining means including means for guiding said converter during turning movement in said cage means about said main axis when said second confining means is in said confining position; and supporting means in contact with said annular surfaces of said cage members and supporting said cage means and said converter for turning movement.

2. A converter support arrangement, comprising, in combination, a converter having a main axis and circular surface means concentric with said main axis; cage means including two rigid and integral cage members located on opposite sides of said converter spaced from the same and having continuous integral annular peripheral surfaces, first confining means including beam means located in the rear of said converter between said cage members and closing said cage means in the rear of said converter, second confining means located in front of said converter and including a pair of levers pivotally mounted on said cage members, respectively, in the space between the latter and said converter and beam means extending between said levers, said second confining means being turnable about an axis substantially normal to said main axis of said converter between a confining position located between said cage members so that said cage means is closed in front of said converter and a releasing position retracted from the front of said converter so that said cage means is open in front of said converter, and means for securing said second confining means in said confining position to said cage members, said first and second confining means including rollers turnably mounted on said beam means of said first confining means and being in rolling engagement with said circular surface means of said converter and radial pins on said beam means of said second confining means for guiding said converter during turning movement in said cage means about said main axis when said second confining means is in said confining position; and supporting means in contact with said annular surfaces of said cage members and supporting said cage means and said converter for turning movement.

3. A converter support arrangement, comprising, in combination, a converter having a main axis and circular surface means concentric with said main axis; cage means including two rigid and integral cage members located on opposite sides of said converter spaced from the same and having continuous integral circular peripheral surfaces with a common axis transverse to said main axis, first confining means including beam means located in the rear of said converter between said cage members and closing said cage means in the rear of said converter, second confining means located in front of said converter and including a pair of levers pivotally mounted on said cage members, respectively, in the space between the latter and said converter and beam means extending between said levers, said second confining means being turnable about an axis substantially normal to said main axis of said converter between a confining position located between said cage members so that said cage means is closed in front of said converter and a releasing position retracted from the front of said converter, so that said cage means is open in front of said converter, and means for securing said second confining means in said confining position to said cage members, said first and second confining means including rollers turnably mounted on said beam means of said first confining means and being in rolling engagement with said circular surface means of said converter and radial pins on said beam means of said second confining means for guiding said converter during turning movement in said cage means about said main axis when said second confining means is in said confining position; and supporting roller means in contact with said circular surfaces of said cage members and supporting said cage means and said converter for turning movement about said common axis.

4. A converter support arrangement, comprising, in combination, a converter having a main axis and circular surface means concentric with said main axis; cage means including two rigid and integral cage members located on opposite sides of said converter spaced from the same and having continuous integral circular peripheral surfaces, a pair of supports respectively mounted on said cage members and including rollers engaging said circular surface means of said converter for supporting the same in axial direction, said circular surfaces having a common axis transverse to said main axis, first confining means including beam means located in the rear of said converter between said cage members and closing said cage means in the rear of said converter, second confining means located in front of said converter and including a pair of levers pivotally mounted on said cage members, respectively, in the space between the latter and said converter and beam means extending between said levers, said second confining means being turnable about an axis substantially normal to said main axis of said converter between a confining position located between said cage members so that said cage means is closed in front of said converter and a releasing position retracted from the front of said converter so that said cage means is open in front of said converter, and means for securing said second confining means in confining position to said cage members, said first and second confining means including rollers turnably mounted on said beam means of said first confining means and being in rolling engagement with said circular surface means of said converter and radial pins on said beam means of said second confining means for guiding said converter during turning movement in said cage means about said main axis when said second confining means is in said confining position; and supporting roller means in contact with said circular surfaces of said cage members and supporting said cage means and said converter for turning movement about said common axis.

5. A converter support arrangement, comprising, in combination, a converter having a main axis; cage means including two rigid and integral cage members located on opposite sides of said converter spaced from the same and having continuous integral annular peripheral surfaces, first confining means located in the rear of said converter between said cage members, and closing said cage means in the rear of said converter, second confining means located in front of said converter and including a pair of levers located respectively in the spaces between said cage members and said converter, said levers having ends respectively mounted on said cage members for turning movement about a second axis substantially normal to said main axis and arcuate beam means extending between said levers spaced from the ends of the same, said second confining means being turnable about said second axis between a confining position located between said cage members so that said cage means is closed in front of said converter and a releasing position retracted from the front of said converter so that said cage means is open in front of said converter, and means for securing the other ends of said levers to said cage members, respectively, in said confining position of said second confining means, said first and second confining means including means for guiding said converter during turning movement in said cage means about said main axis when said second confining means is in said confining position; and supporting means in contact with said annular surfaces of said cage members and supporting said cage means and said converter for turning movement.

6. A converter support arrangement, comprising, in combination, a converter having a main axis; cage means including two rigid and integral annular cage members located on opposite sides of said converter spaced from the same and having continuous integral circular peripheral surfaces, said circular surfaces having a common axis transverse to said main axis, first confining means located in the rear of said converter between said cage members and closing said cage means in the rear of said converter, second confining means located in front of said converter and including a pair of levers located respectively in the spaces between said cage members and said converter, said levers having ends respectively mounted on said cage members for turning movement about a second axis substantially normal to said main axis and arcuate beam means extending between said levers spaced from the ends of the same, said second confining means being turnable about said second axis between a confining position located between said cage members so that said cage means is closed in front of said converter and a releasing position retracted from the front of said converter so that said cage means is open in front of said converter, and pin means for securing the other ends of said levers to said cage members, respectively, in said confining position of said second confining means, said levers and cage members having openings for receiving said pin means, said first and second confining means including means for guiding said converter during turning movement in said cage means about said main axis when said second confining means is in said confining position; and two pairs of supporting roller means respectively in rolling engagement in the said circular surfaces of said cage members and supporting said cage means and said converter for turning movement about said common axis.

7. A converter support arangement, comprising, in combination, a converter having a main axis; cage means including two rigid and integral annular cage members located on opposite sides of said converter spaced from the same and having continuous integral circular peripheral surfaces, said circular surfaces having a common axis transverse to said main axis and intersecting the same, first confining means located in the rear of said converter betwen said cage members and closing said cage means in the rear of said converter, second confining means located in front of said converter and including a pair of levers located respectively in the spaces between said cage members and said converter, said levers having ends respectively mounted on said cage members for turning movement about a second axis substantially normal to said main axis and arcuate beam means extending between said levers spaced from the ends of the same, said second confining means being turnable about said second axis between a confining position located between said cage members so that said cage means is closed in front of said converter and a releasing position retracted from the front of said converter and located above the upper axial end of said converter when the same is in a position in which said main axis is vertical so that said cage means is open in front of said converter, and pin means for securing the other ends of said levers to said cage members, respectively, in said confining position of said second confining means, said levers and cage members having openings for receiving said pin means, said first and second confining means including means for guiding said converter during turning movement in said cage means about said main axis when said second confining means is in said confining position; and two pairs of supporting roller means respectively in rolling engagement in the said circular surfaces of said cage members and supporting said cage means and said converter for turning movement about said common axis.

8. A converter support arrangement comprising, in combination, a converter having a main axis and circular surface means concentric with said main axis; cage means including two rigid and integral cage members located on opposite sides of said converter spaced from the same and extending in planes parallel to said main axis and having each a continuous circular peripheral surface arranged along a common axis transverse to said main axis, first confining means including beam means located in the rear of said converter between said cage members, fixedly connected thereto and closing said cage means in the rear of said converter, second confining means located in the front of said converter and including a pair of levers extending parallel to said planes between said cage members and said converter and being connected at one end thereof to said cage members, respectively, for pivoting movement about a pivot axis transverse to said main axis, and beam means extending between said levers, said second confining means being turnable about said pivot axis between a confining position in which said beam means connected to said levers extend between said cage members so that said cage means is closed in front of converter and a releasing position in which said levers are turned about said pivot axis to a position in which the beam means connected thereto are located outside a space defined by two parallel planes extending normal to the main axis through opposite ends of said converter, and pin means shiftably mounted on said cage members and movable in and out of openings formed in the other ends of said levers for releasably locking said second confining means in said confining position; first supporting roller means mounted on said cage members and engaging said circular surface means of said converter for supporting said converter on said cage means turnable about said main axis and movable in a direction transverse to said main axis; and second supporting roller means in contact with said circular surfaces of said rigid and integral cage members and supporting said cage means and said converter for turning movement about said common axis.

References Cited in the file of this patent
UNITED STATES PATENTS

| 253,049 | Holley | Jan. 31, 1882 |
| 1,614,400 | Selman | Jan. 11, 1927 |
| 3,005,628 | Rinesch | Oct. 24, 1961 |
| 3,031,177 | Hofmeister | Apr. 24, 1962 |

FOREIGN PATENTS

| 813,581 | Germany | Sept. 13, 1951 |
| 78,342 | Netherlands | June 15, 1955 |
| 776,962 | Great Britain | June 12, 1957 |